Figures 1, 2:
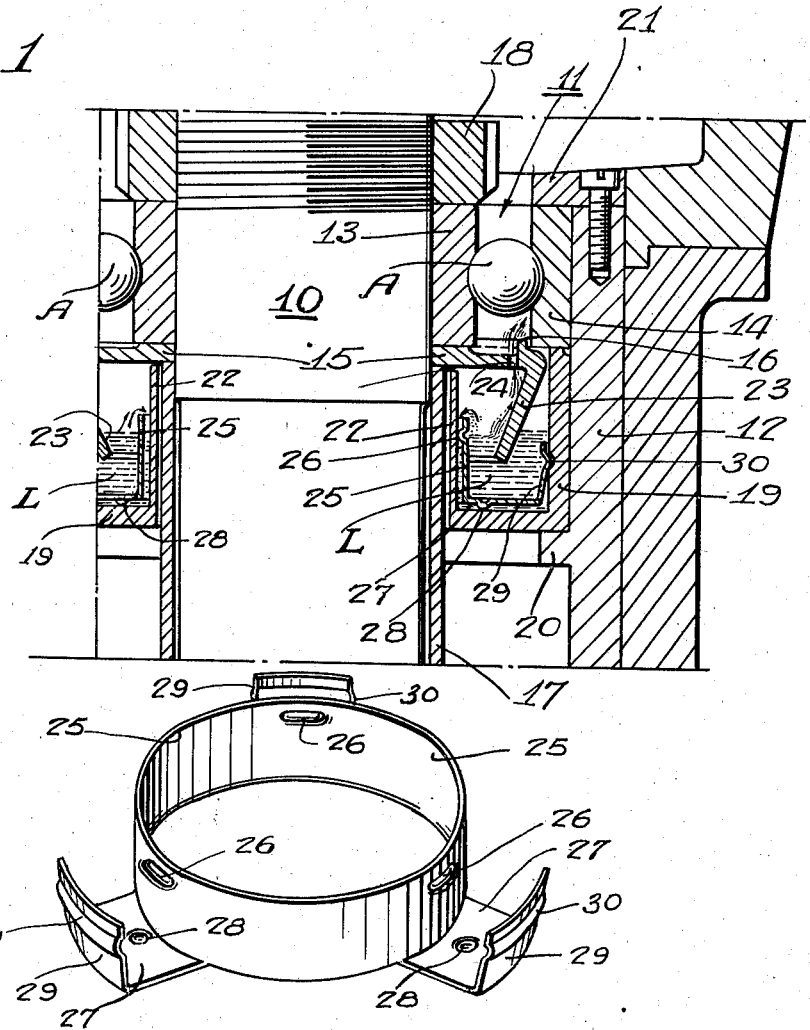

April 13, 1948. C. T. ASBURY 2,439,709
BEARING LUBRICATOR
Filed Aug. 9, 1945

Inventor:—
Charles T. Asbury
by his Attorneys
Howson + Howson

Patented Apr. 13, 1948

2,439,709

UNITED STATES PATENT OFFICE 2,439,709

BEARING LUBRICATOR

Charles T. Asbury, Abington, Pa.

Application August 9, 1945, Serial No. 609,775

6 Claims. (Cl. 308—187)

This invention relates to lubricating means for ball or roller bearings supporting or guiding high speed rotary shafts which operate on vertical axes, and more particularly of that type of lubricator in which centrifugal force is depended upon to deliver the lubricant to the parts being lubricated.

In bearings of this type of which I am familiar, the centrifugal element delivering the oil merely acts to form an oil mist and depends upon this mist to provide sufficient lubrication for the bearing. An important object of the invention is the provision in a bearing of this type of means insuring positive delivery of the lubricant directly to the bearing as differentiated from the rather haphazard delivery of prior structures.

Another object of the invention is the provision, in a bearing lubricator of this character, of an arrangement preventing creeping of the lubricant from the lubricant reservoir as a result of the rapid rotative movement of the centrifugal element.

A further object of the invention is the provision of an anti-creeping element for such reservoirs which is so constructed that it is readily removed to permit cleansing of the reservoir when this becomes necessary.

These and other objects I attain by the construction shown in the accompanying drawing, wherein for the purpose of illustration I have shown a preferred embodiment of my invention and wherein:

Fig. 1 is a fragmentary vertical sectional view illustrating a shaft supporting bearing lubricated by a means constructed in accordance with my invention; and Fig. 2 is a perspective view of the supplemental wall element reservoir.

Referring now more particularly to the drawings, the numeral 10 generally designates a vertically disposed shaft adapted to operate at high speeds, and 11 a planetary type anti-friction bearing disposed between this shaft and an associated stationary casing member 12, it being understood that by the term "planetary type anti-friction bearing" I include all bearings having inner and outer races between which is interposed a rotating anti-friction element such as a roller or ball. The inner race 13 of bearing 11 is secured to shaft 10 in any suitable manner, while the outer race 14 thereof is fixed with relation to casing 12.

Arranged immediately below the bearing 11 and likewise fixed against rotation with relation to shaft 10 is a disc member 15 having upon its upper surface a rib 16 projecting upwardly between the space between the inner and outer races 13 and 14. As at present shown, the inner race 13 and disc member 15 are clamped between a sleeve 17 rotating with shaft 10 and a nut 18 threaded upon the shaft, although obviously any other suitable means of securing these elements in position may be employed as desired. Likewise arranged below the bearing and below member 15 is a liquid lubricant reservoir 19, stationary with relation to the casing member 12 and at present shown as held in position together with the outer race member 14 of the bearing 11 between an internal shoulder 20 on casing member 12 and a clamping ring 21 secured to said casing member. Reservoir 19 is in the form of an annular trough, the inner wall 22 of which is spaced from the opposed rotating surface, sleeve 17, to eliminate any possible friction therebetween and having its upper end slightly spaced from the lower surface of the member 15 for the same purpose.

Member 15 has a depending inwardly sloping annular flange 23, the lower end of which extends into the lubricant L in reservoir 19 and member 15 has ports 24 permitting the passage of lubricant from the inner face of this flange to the inner face of rib 16. From the upper edge of the rib, lubricant will be delivered directly against the inner wall of the outer race of bearing 11. Since the lubricant so delivered will have an upward component in its movement, it will be delivered directly to the anti-friction element A of the bearing 11 in liquid rather than vapor form and will thus serve to properly lubricate the same.

It has been found that in bearing lubricators of this type the rapid rotative movement of the flange 23 in the lubricant L causes the lubricant to rotate and as a result of its rotation to creep upwardly along the side walls of the reservoir. While creepage can exercise no deleterious effect at the outer wall of the reservoir, at the inner wall thereof, due to the necessary clearances provided, creepage causes the lubricant to pass upwardly and over the upper edge of the inner wall and then move downwardly with possible injury to portions of the mechanism lying therebeneath. As a specific example, in a belt driven homogenizer embodying a bearing of this type and in which the belt pulley is located beneath the bearing, this oil seepage was found to seriously interfere with proper operation.

To eliminate this, I provide the reservoir with a false inner wall 25 in the form of a sleeve, proper radial location of which, in respect to said inner wall, is provided by pressed out spacer tits 26. The space between this sleeve and the inner wall is open at its upper and lower ends, the upper end of the space being located well below the upper end of the wall 22 and the lower end thereof being spaced above the bottom of the reservoir and preferably beneath the liquid level therein. In order that this sleeve may be readily held in position and at the same time be removable to permit cleansing of the reservoir when this becomes necessary, the sleeve is provided at its lower end with radially extending arms 27 having pressed out portions 28 engaging the bottom of the reservoir to thus maintain the sleeve in spaced relation to the bottom of the reservoir and having at their extremities spring flanges 29 having latch humps 30 to engage in a groove formed in the inner surface of the outer wall of the reservoir. With the use of a false inner wall of this character, the capillary attraction which assists the creepage in causing the escape of lubricant over the upper end of the inner wall 22 is broken, and without assistance of capillary attraction the creepage is insufficient to cause actual overflow. Lubricant moving over the upper end of the false inner wall provided by sleeve 25 passes downwardly through the space between the sleeve and inner wall to rejoin the fluid in the reservoir.

Since the construction illustrated is obviously capable of considerable modification without departing from the spirit of my invention, I do not wish to be understood as limiting myself thereto except as hereinafter claimed.

I claim:

1. Means for lubricating planetary type antifriction bearings for high speed shafts comprising a member secured to the shaft immediately below the bearing and having on its upper face a rib projecting into the space between the races of the bearing, a stationary annular reservoir for liquid lubricant surrounding the shaft below said member and an annular downwardly and inwardly extending flange on said member the lower end of which extends into the lubricant in said reservoir, said member having ports to deliver lubricant moving upwardly along said flange to the inner face of said rib, said reservoir having an inner wall formed in two radially spaced sections the space between which is open at its upper and lower ends and has its upper end disposed below the upper end of the radially inner face of said sections.

2. Means for lubricating planetary type antifriction bearings for high speed shafts comprising a member secured to the shaft immediately below the bearing, a stationary annular reservoir for liquid lubricant surrounding the shaft below said member and an annular downwardly and inwardly extending flange on said member the lower end of which extends into the lubricant in said reservoir, said reservoir having an inner wall formed in two radially spaced sections, the space between which is open at its upper and lower ends and has its upper end disposed below the upper end of the radially inner face of said sections.

3. Means for lubricating planetary type antifriction bearings for high speed shafts comprising a member secured to the shaft immediately below the bearing and having on its upper face a rib projecting into the space between the races of the bearing, a stationary annular reservoir for liquid lubricant surrounding the shaft below said member and an annular downwardly and inwardly extending flange on said member the lower end of which extends into the lubricant in said reservoir, said member having ports to deliver lubricant moving upwardly along said flange to the inner face of said rib, said reservoir having an inner wall formed in two radially spaced sections the space between which is open at its upper and lower ends and has its upper end disposed below the upper end of the radially inner face of said sections, the inner wall section comprising a removable sleeve and means to releasably secure said sleeve in position in the reservoir.

4. Means for lubricating planetary type antifriction bearings for high speed shafts comprising a member secured to the shaft immediately below the bearing, a stationary annular reservoir for liquid lubricant surrounding the shaft below said member and an annular downwardly and inwardly extending flange on said member the lower end of which extends into the lubricant in said reservoir, said reservoir having an inner wall formed in two radially spaced sections, the space between which is open at its upper and lower ends and has its upper end disposed below the upper end of the radially inner face of said sections, the inner wall section comprising a removable sleeve and means to releasably secure said sleeve in position in the reservoir.

5. Means for lubricating planetary type antifriction bearings for high speed shafts comprising a member secured to the shaft immediately below the bearing and having on its upper face a rib projecting into the space between the races of the bearing, a stationary annular reservoir for liquid lubricant surrounding the shaft below said member and an annular downwardly and inwardly extending flange on said member the lower end of which extends into the lubricant in said reservoir, said member having ports to deliver lubricant moving upwardly along said flange to the inner face of said rib, said reservoir having an inner wall formed in two radially spaced sections the space between which is open at its upper and lower ends and has its upper end disposed below the upper end of the radially inner face of said sections, the inner wall section comprising a sleeve having means to hold it in properly annularly spaced relation to the outer wall section and means to removably secure said sleeve in position in the reservoir including means to hold the lower end of sleeve in spaced relation to the bottom of the reservoir.

6. Means for lubricating planetary type antifriction bearings for high speed shafts comprising a member secured to the shaft immediately below the bearing, a stationary annular reservoir for liquid lubricant surrounding the shaft below said member and an annular downwardly and inwardly extending flange on said member the lower end of which extends into the lubricant in said reservoir, said reservoir having an inner wall formed in two radially spaced sections, the space between which is open at its upper and lower ends and has its upper end disposed below the upper end of the radially inner face of said sections, the inner wall section comprising a sleeve having means to hold it in properly annularly spaced relation to the outer wall section and means to removably secure said sleeve in position in the reservoir including means to hold the lower end of sleeve in spaced relation to the bottom of the reservoir.

CHARLES T. ASBURY.

REFERENCES CITED

The following references are of record in the file of this patent:

UNITED STATES PATENTS

| Number | Name | Date |
|---|---|---|
| 1,920,326 | Schuck et al. | Aug. 1, 1933 |
| 2,043,885 | Davidson | June 9, 1936 |
| 2,224,255 | Delaval-Crow | Dec. 10, 1940 |

FOREIGN PATENTS

| Number | Country | Date |
|---|---|---|
| 578,390 | France | Sept. 24, 1924 |